(12) United States Patent
Hwang

(10) Patent No.: US 8,917,588 B2
(45) Date of Patent: Dec. 23, 2014

(54) FAST FOURIER TRANSFORM AND INVERSE FAST FOURIER TRANSFORM (FFT/IFFT) OPERATING CORE

(75) Inventor: Chang-ik Hwang, Namyangju-si (KR)

(73) Assignees: Silicon Motion, Inc., Guangdong (CN); FCI Inc., Gyeonggi-Do (KR)

( * ) Notice: Subject to any disclaimer, the term of this patent is extended or adjusted under 35 U.S.C. 154(b) by 1049 days.

(21) Appl. No.: 12/996,779

(22) PCT Filed: Jun. 8, 2009

(86) PCT No.: PCT/CN2009/072182
§ 371 (c)(1),
(2), (4) Date: Mar. 28, 2011

(87) PCT Pub. No.: WO2009/149654
PCT Pub. Date: Dec. 17, 2009

(65) Prior Publication Data
US 2011/0164490 A1 Jul. 7, 2011

(30) Foreign Application Priority Data
Jun. 9, 2008 (KR) .......................... 10-2008-0053456

(51) Int. Cl.
*H04J 11/00* (2006.01)
*H04L 27/26* (2006.01)
*G06F 17/14* (2006.01)

(52) U.S. Cl.
CPC ............ *G06F 17/142* (2013.01); *H04L 27/263* (2013.01)
USPC ............ 370/210; 708/200; 708/403; 708/404

(58) Field of Classification Search
CPC .......................... H04L 27/263; G06F 17/142
USPC .......... 370/203, 210; 708/100, 200, 400, 403, 708/404
See application file for complete search history.

(56) References Cited

U.S. PATENT DOCUMENTS

| | | | |
|---|---|---|---|
| 7,197,525 B2 | 3/2007 | Stein | |
| 2005/0174931 A1 | 8/2005 | Krishnamoorthi | |
| 2006/0010188 A1* | 1/2006 | Solomon et al. | 708/400 |
| 2008/0320069 A1* | 12/2008 | Lin et al. | 708/404 |

FOREIGN PATENT DOCUMENTS

| | | |
|---|---|---|
| CN | 101110803 A | 1/2008 |
| KR | 20050017065 A | 2/2005 |
| TW | 200742322 A1 | 11/2007 |

* cited by examiner

*Primary Examiner* — Un C Cho
*Assistant Examiner* — Siming Liu

(57) ABSTRACT

An FFT/IFFT operating core capable of minimizing a required memory depth during operation is disclosed. The FFT/IFFT operating core includes an inputting buffer, a first multiplexer, an operating module, and a controlling module. The inputting buffer stores and outputs a first FFT input sequence. The first multiplexer is utilized to multiplex the first FFT input sequence and a third input sequence. The controlling module generates a process indicating signal and a bypass indicating signal. The operating module has a plurality of operating stages in series. The operating module transforms the first and third FFT input sequences into a first and third FFT output sequences, respectively, and it transforms a second IFFT input sequence into a second IFFT output sequence.

9 Claims, 13 Drawing Sheets

| FFT SIZE | CONFIGURATION OF OPERATING STAGES | |
|---|---|---|
| | DIT | DIF |
| 16 | 1→2 | 3→1 |
| 32 | 0→1→2 | 3→1→0 |
| 64 | 1→2→3 | 4→2→1 |
| 128 | 0→1→2→3 | 4→2→1→0 |
| 256 | 1→2→3→4 | 5→3→2→1 |
| 512 | 0→1→2→3→4 | 5→3→2→1→0 |
| 1024 | 1→2→3→4→5 | 6→4→3→2→1 |
| 2048 | 0→1→2→3→4→5 | 6→4→3→2→1→0 |
| 4096 | 1→2→3→4→5→6 | 6→5→4→3→2→1 |
| 8192 | 0→1→2→3→4→5→6 | 6→5→4→3→2→1→0 |

FIG. 4

| OPERATING STAGE/SIZE | DIT 0 | DIT 1 | DIT 2 | DIT 3 | DIT 4 | DIT 5 | DIT 6 | DIF 6 | DIF 5 | DIF 4 | DIF 3 | DIF 2 | DIF 1 | DIF 0 |
|---|---|---|---|---|---|---|---|---|---|---|---|---|---|---|
| 16 | 0 | 1 | 4 | | | | | | | | | 2 | 1 | 0 |
| 32 | 1 | 1 | 8 | | | | | | | | | 4 | 1 | 1 |
| 64 | | 2 | 4 | 16 | | | | | | | 4 | 2 | 2 | |
| 128 | 1 | 1 | 8 | 32 | | | | | | | 8 | 4 | 1 | 1 |
| 256 | | 2 | 4 | 16 | 64 | | | | | 16 | 4 | 2 | 2 | |
| 512 | 1 | 1 | 8 | 32 | 128 | | | | | 32 | 8 | 4 | 1 | 1 |
| 1024 | | 2 | 4 | 16 | 64 | 256 | | | 64 | 16 | 4 | 2 | 2 | |
| 2048 | 1 | 1 | 8 | 32 | 128 | 512 | | | 128 | 32 | 8 | 4 | 1 | 1 |
| 4096 | | 2 | 4 | 16 | 64 | 256 | 1024 | 256 | 64 | 16 | 4 | 2 | 2 | |
| 8192 | 1 | 1 | 8 | 32 | 128 | 512 | 2048 | 512 | 128 | 32 | 8 | 4 | 1 | 1 |

FIG. 5

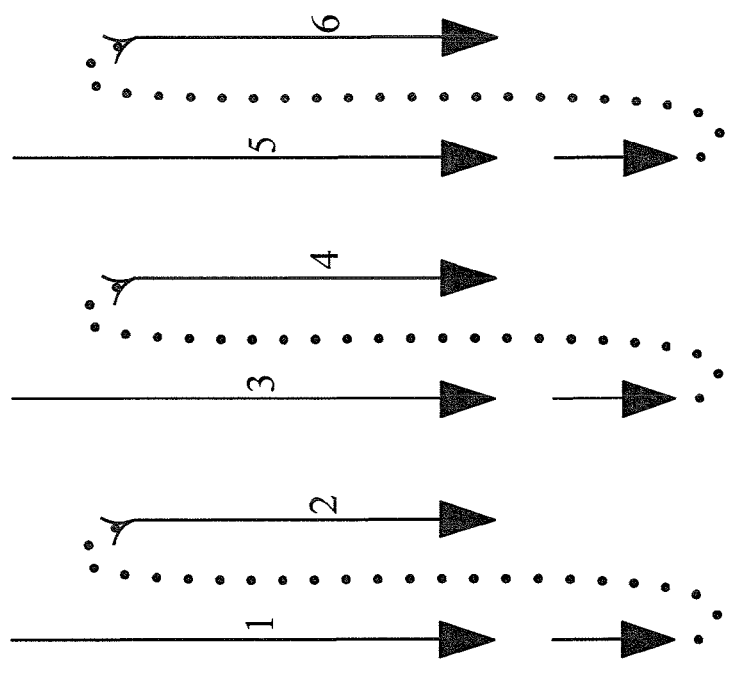
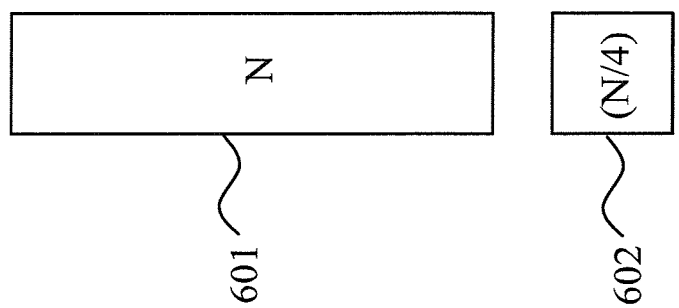
FIG. 6

| | CLOCK FREQUENCY OF MEMORY = CLOCK FREQUENCY OF THE FFT/IFFT OPERATING CORE | CLOCK FREQUENCY OF MEMORY = 2×CLOCK FREQUENCY OF THE FFT/IFFT OPERATING CORE |
|---|---|---|
| INPUTTING BUFFER | 8192×1 SAMPLE SP-SRAM (OR 4096×1 SAMPLE SP-SRAM OR 2048×1 AND 6144×1 SAMPLE) | |
| AUXILIARY MEMORY | 2048×1 SAMPLE SP-SRAM | |
| SIXTH OPERATING STAGE | 2048×3 SAMPLE DP-SRAM | 2048×3 SAMPLE SP-SRAM |
| FIFTH OPERATING STAGE | 512×3 SAMPLE DP-SRAM | 512×3 SAMPLE SP-SRAM |
| FOURTH OPERATING STAGE | 128×3 SAMPLE DP-SRAM | 128×3 SAMPLE SP-SRAM |
| THIRD OPERATING STAGE | 32×3 SAMPLE D-F/Fs | 32×3 SAMPLE D-F/Fs |
| SECOND OPERATING STAGE | 8×3 SAMPLE D-F/Fs | 8×3 SAMPLE D-F/Fs |
| FIRST OPERATING STAGE | 2×3 SAMPLE D-F/Fs | 2×3 SAMPLE D-F/Fs |
| ZEROTH OPERATING STAGE | 1 SAMPLE D-F/Fs | 1 SAMPLE D-F/Fs |

DP-SRAM : DUAL PORT-STATIC RANDOM ACCESS MEMORY
SP-SRAM : SINGLE PORT-STATIC RANDOM ACCESS MEMORY

FIG. 8

| | CLOCK FREQUENCY OF MEMORY = CLOCK FREQUENCY OF THE FFT/IFFT OPERATING CORE | CLOCK FREQUENCY OF MEMORY = 2X CLOCK FREQUENCY OF THE FFT/IFFT OPERATING CORE |
|---|---|---|
| INPUTTING BUFFER | FIVE 2048x1 SAMPLE SP-SRAM | 10240x1 SAMPLE SP-SRAM |
| SIXTH OPERATING STAGE | 2048x3 SAMPLE DP-SRAM | 2048x3 SAMPLE SP-SRAM |
| FIFTH OPERATING STAGE | 512x3 SAMPLE DP-SRAM | 512x3 SAMPLE SP-SRAM |
| FOURTH OPERATING STAGE | 128x3 SAMPLE DP-SRAM | 128x3 SAMPLE SP-SRAM |
| THIRD OPERATING STAGE | 32x3 SAMPLE D-F/Fs | 32x3 SAMPLE D-F/Fs |
| SECOND OPERATING STAGE | 8x3 SAMPLE D-F/Fs | 8x3 SAMPLE D-F/Fs |
| FIRST OPERATING STAGE | 2x3 SAMPLE D-F/Fs | 2x3 SAMPLE D-F/Fs |
| ZEROTH OPERATING STAGE | 1 SAMPLE D-F/Fs | 1 SAMPLE D-F/Fs |

DP-SRAM : DUAL PORT-STATIC RANDOM ACCESS MEMORY
SP-SRAM : SINGLE PORT-STATIC RANDOM ACCESS MEMORY

FAST FOURIER TRANSFORM AND INVERSE FAST FOURIER TRANSFORM (FFT/IFFT) OPERATING CORE

TECHNICAL FIELD OF THE INVENTION

The present invention relates to an operating core, and more particularly to a fast Fourier transform/inverse fast Fourier transform operating core being utilized in an OFDM receiver.

BACKGROUND OF THE INVENTION

In an orthogonal frequency division multiplexing system (hereinafter referred to as OFDM), N-point (where N being an integer) discrete Fourier transform (hereinafter referred to as DFT) is required. The number of mathematical operation of the DFT is proportional to N. When N is large, an algorithm capable of performing the DFT operation effectively is required. A fast Fourier transform (hereinafter referred to as FFT) is capable of continuously dividing an N-length input sequence into a plurality of smaller subsequences. That is, the FFT is such an algorithm capable of decreasing the number of the DFT operation significantly. Being served as an algorithm capable of dividing an N-length sequence into a plurality of smaller subsequences, the FFT comprises a decimation-in-time (hereinafter referred to as DIT) algorithm and a decimation-in-frequency (hereinafter referred to as DIF) algorithm. Since the N-point FFT algorithm can be designed in an OFDM modulation/demodulation system, the OFDM modulation/demodulation system is capable of implementing the DIT algorithm and the DIF algorithm.

The FFT is utilized to transform time domain signals into frequency domain signals; the IFFT is utilized to transform the frequency domain signals into the time domain signals. Because there is a need to analyze the frequency domain in wireless communications, it is more effective to perform channel estimation by using the frequency domain signals generated by the FFT. A conventional FFT apparatus comprises a single processing element structure (hereinafter referred to as SPE) utilizing shared memory, and a pipeline structure utilizing delay feedback registers among operators of operating stages.

An N-point FFT apparatus which is implemented by the SPE structure requires the number of operating stages to be the same as the number of N samples memory read/write access. As a result, there is a drawback of great output latency in the SPE structure. In contrast, an advantage in the pipeline structure is that the output latency of the pipeline structure is only N-cycles. Although memory depth of the pipeline structure is the same as the SPE structure, drawbacks of the pipeline structure includes requiring the same number of memory as the operating stages, and orders of input data are different from orders of output data. Accordingly, in order to easily proceed processes after the FFT operation, memories for transforming data sequence are added, and the output latency with regard to a maximum range of the N-cycles is increased, so that the orders of input data are the same as the orders of output data.

Since the FFT apparatus being utilized in the OFDM modulation/demodulation system requires to process a plurality of continuous FFT signals, memories are needed to store a next signal while a current signal is processed. In addition, memories having the delay feedback registers constitute each operating stage of the FFT in the pipeline structure. The memories will occupy a greater part of an area in the FFT apparatus. Accordingly, a greater number of memories will lead to a drawback of occupying a larger area in the system.

SUMMARY OF THE INVENTION

In order to solve the above-mentioned problem, a primary objective of the present invention is to provide an FFT/IFFT operating core capable of minimizing storage capacity being required in operating processes of FFT/IFFT.

The FFT/IFFT operating core according to the present invention comprises an inputting buffer, a first multiplexer, an operating module, and a controlling module. The inputting buffer is utilized for storing and outputting a first FFT input sequence. The first multiplexer is utilized for multiplexing a first FFT input sequence and a third FFT input sequence. The controlling module is utilized for generating a process indicating signal and a bypass indicating signal. The process indicating signal indicates that said input sequence inputted to the operating module is processed by either a DIT method or a DIF method. The bypass indicating signal indicates whether said input sequence inputted to the operating module directly passes through the operating module without being processed. The process indicating signal and the bypass indicating signal are determined by a size of the FFT input sequence. The operating module respectively transforms the first FFT and the third FFT input sequences into a first FFT and a third FFT output sequences, and transforms a second IFFT input sequence into a second IFFT output sequence. The operating module has a plurality of operating stages.

The present invention can significantly decrease the required storage capacity by sharing one FFT/IFFT operating core.

BRIEF DESCRIPTION OF THE DRAWINGS

FIG. 4 illustrates operating stages used for different sizes of input sequences and corresponding orders of the operating stages;

FIG. 5 illustrates memory depths utilized in each operating stage when different sizes of input sequences are inputted;

FIG. 6 illustrates a structure of the inputting buffer and the processes according to one embodiment of the present invention when bits per sample stored in the inputting buffer are less than N bits per sample which can be processed in the operating stages of the FFT/IFFT operating core;

FIG. 8 illustrates memory types and memory depth of each operating stage when bits per sample stored in the inputting buffer is less than bits per sample which can be processed in the operating stages of the FFT/IFFT operating core 100;

FIG. 9 illustrates memory types and memory depth of each operating stage when bits per sample stored in the inputting buffer is equal to bits per sample which can be processed in the operating stages of the FFT/IFFT operating core;

DETAILED DESCRIPTION OF THE INVENTION

Figure 1:
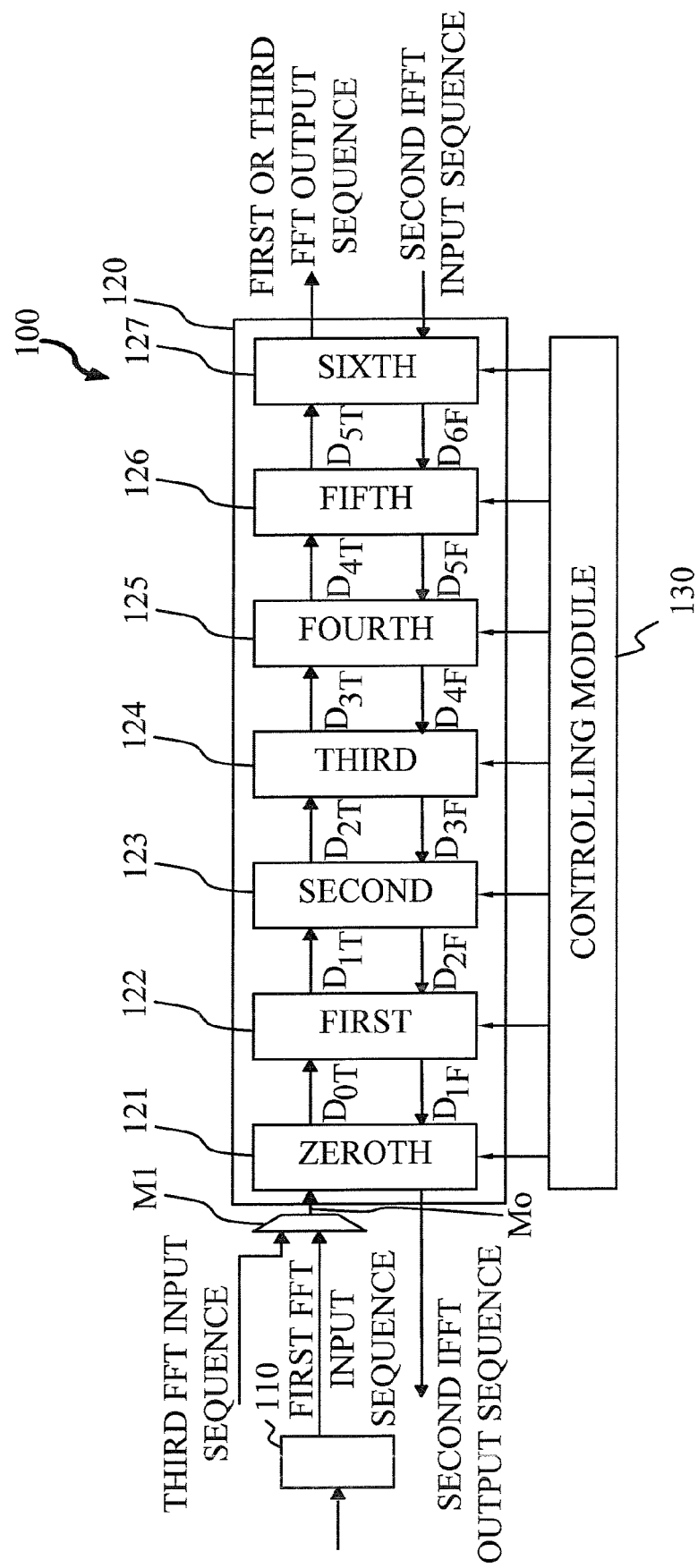
FIG. 1 illustrates the FFT/IFFT operating core according to one embodiment of the present invention.

The present invention relates to an FFT/IFFT operating core being utilized in an OFDM receiver when three times of required pipeline FFT processes corresponding to each symbol are proceeded. The operating core alternatively proceeds the DIT algorithm and the DIF algorithm without exchanging input sequences. By using core clock frequency which is M (M being an integer) times sampling clock frequency of the FFT input sequence and output sequence, a plurality of FFT operations can be performed. For example, M is 4 for the OFDM receiver which will proceed three times of FFT processes. It is noted that the DIT algorithm is utilized for decomposing a time sequence into a plurality of subsequences, and the DIF algorithm is utilized for decomposing a frequency element into a plurality of subsequences.

In addition, in order to perform variable N-point FFT operation, specific memories applied in operating stages are shared based on the DIT algorithm, the DIF algorithm, and the FFT input sequence.

The present invention will be described in detail in conjunction with the appending drawings.

The following TABLE 1 relates to three times of the required FFT processes corresponding to each symbol in the OFDM receiver.

TABLE 1

| FFT order | FFT/ IFFT | DIT/ DIF | input sequence | output sequence | latency |
|---|---|---|---|---|---|
| 1st | FFT | DIT | permutated ordered | naturally ordered | N |
| 2nd | IFFT | DIF | naturally ordered | permutated ordered | N |
| 3rd | FFT | DIT | permutated ordered | naturally ordered | 2 × N |

As shown in TABLE 1, orders of the output sequence are different from orders of the input sequence whether the FFT operation or the IFFT operation is performed.

By using the DIT algorithm, the 1st order transforms the symbol carriers, i.e. the input sequence of the OFDM receiver in the time domain into the output sequence in the frequency domain. Compared with the orders of the input sequence, the orders of the output sequence have been changed. Further, the 2nd order uses the DIF IFFT algorithm to perform channel estimation, and the 3rd order uses the DIT FFT algorithm to perform channel estimation.

There exists what is known as a fading characteristic in wireless channel environment. As a result, irregular changes will occur in channel states in the time domain and the frequency domain at different time point. Further, the fading characteristic means that the irregular changes will occur in amplitudes and phases due to interference between at least two electromagnetic waves. The channel estimation is to estimate the amplitudes and the phases of the channel. That is, the channel estimation means processes of estimating frequency response of the wireless channel.

The FFT size usually means a maximum quantity of points which can be processed by the FFT/IFFT operating core. The following assumes that the FFT size of the FFT/IFFT operating core is 8192-point for the purpose of description simplicity. That is, the maximum quantity of points which can be processed by the FFT/IFFT operating core is 8192. It is noted that although the FFT/IFFT operating core processes 8192 points or less herein, all modifications and alterations which maintain the spirit and realm of the present invention are within the scope as defined in the appended claims.

FIG. 1 illustrates the FFT/IFFT operating core 100 according to one embodiment of the present invention.

As shown in FIG. 1, the FFT/IFFT operating core 100 comprises an inputting buffer 110, a first multiplexer M1, an operating module 120, and a controlling module 130.

The inputting buffer 110 is utilized for storing and outputting a first FFT input sequence.

The first multiplexer M1 is utilized for multiplexing the first FFT input sequence and a third FFT input sequence.

Figure 2:
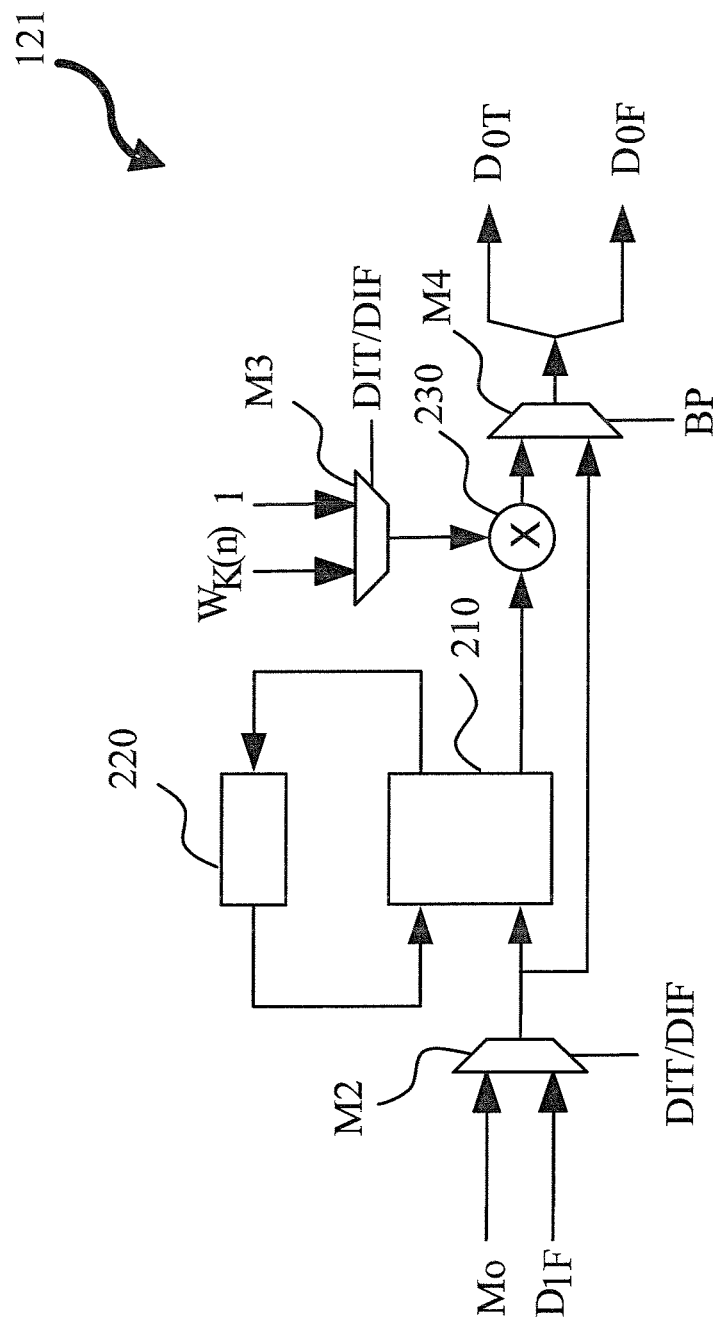
FIG. 2 illustrates internal modules of the zeroth operating stages in FIG. 1.
Figure 3:
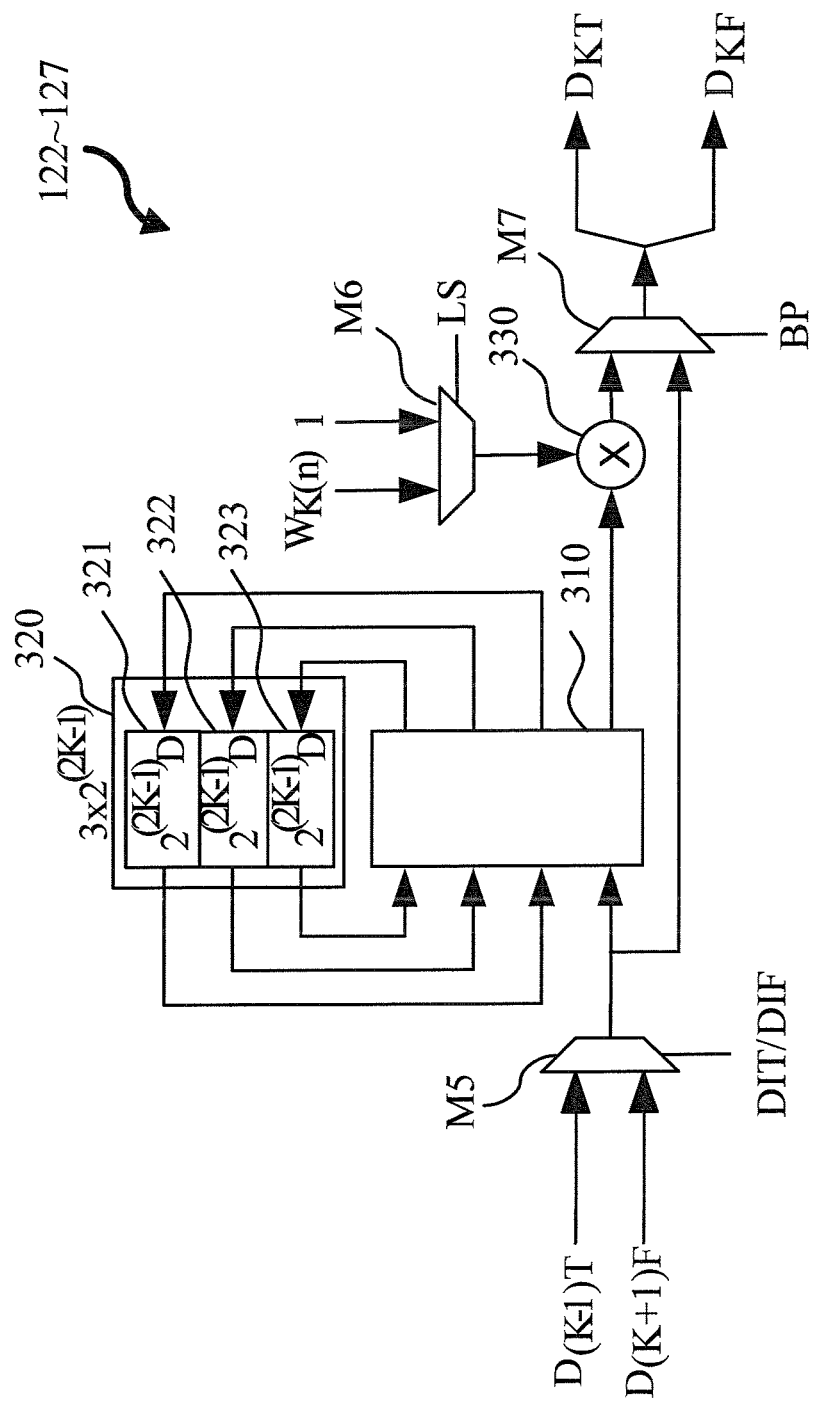
FIG. 3 illustrates internal modules of one selected from the first operating stages to the sixth operating stages in FIG. 1.

The controlling module 130 is utilized for generating the process indicating signal DIT/DIF (as shown in FIG. 2 and FIG. 3) and the bypass indicating signal BP (as shown in FIG. 3). The process indicating signal DIF/DIF indicates that said input sequence inputted to the operating module 120 is processed by either the DIT algorithm or the DIF algorithm. The bypass indicating signal BP indicates whether said input sequence inputted to the operating module 120 directly passes the operating module 120 without being processed. The process indicating signal DIT/DIF and the bypass indicating signal BP are determined by a size of the first FFT input sequence, a size of the third FFT input sequence, and a size of the second IFFT input sequence.

The operating module 120 is utilized for respectively transforming the first FFT input sequence and the third FFT input sequence into a first FFT output sequence and a third FFT output sequence, and transforming a second IFFT input sequence into a second IFFT output sequence based on the process indicating signal DIT/DIF and the bypass indicating signal BP. The operating module 120 has a plurality of operating stages in series.

A zeroth operating stage 121, based on the corresponding process indicating signal and the corresponding bypass indicating signal, is utilized either for performing one of bypassing an output signal Mo of the first multiplexer M1 and transforming the output signal Mo of the first multiplexer M1 by an FFT operation so as to generate a first output signal $D_{0T}$, or for performing one of bypassing a second output signal $D_{1F}$ of a first operating stage 122 and transforming the second output signal $D_{1F}$ of the first operating stage 122 by an IFFT operation so as to generate a second output signal $D_{0F}$ (not shown).

A first operating stage 122, based on the corresponding process indicating signal and the corresponding bypass indicating signal, is utilized either for performing one of bypassing the first output signal $D_{0T}$ of the zeroth operating stage 121 and transforming the first output signal $D_{0T}$ of the zeroth operating stage 121 by an FFT operation so as to generate a first output signal $D_{1T}$, or for performing one of bypassing a second output signal $D_{2F}$ of a second operating stage 123 and transforming the second output signal $D_{2F}$ of the second operating stage by an IFFT operation so as to generate a second output signal $D_{1F}$.

Each one of a second operating stage 123, a third operating stage 124, a fourth operating stage 125, and a fifth operating stage 126 has similar manners to the first operating stage 122, and therefore are not described in details herein.

A sixth operating stage 127, based on the corresponding process indicating signal and the corresponding bypass indicating signal, is utilized either for performing one of bypassing a first output signal $D_{5T}$ of the fifth operating stage 126 and transforming the first output signal $D_{5T}$ of the fifth operating stage 126 by an FFT operation so as to generate a first output signal $D_{6T}$ (now shown), or for performing one of bypassing the second IFFT input sequence and transforming the second IFFT input sequence by an IFFT operation so as to generate a second output signal $D_{6F}$.

In conclusion, when the first input sequence and the third input sequence are inputted to the operating module 120, the DIT algorithm is performed from the zeroth operating stage 121 to the sixth operating stage 127 so as to generate the first output sequence and the third output sequence. When the second input sequence is inputted to the operating module 120, the DIF algorithm is performed from the sixth operating stage 127 to the zeroth operating stage 121 so as to generate the second output sequence.

Directions of performing the FFT operation and the IFFT operation are determined by the process indicating signal DIT/DIF. For 8192-point FFT operation and IFFT operation, the operating stages 121-127 in series are all used. However, for FFT operation and IFFT operation smaller than 8192 points, a part of the operating stages 121-127 are not used based on the bypass indicating signal BP. That is, the bypass indicating signals BPs corresponding to the operating stages which are not used can be enabled so that the sequence inputted to the corresponding operating stages are bypassed to the next operating stage without performing any operation.

As mentioned above, N of the FFT/IFFT operating core 100 shown in FIG. 1 is 8192, i.e., 8192-point FFT/IFFT operating core. Accordingly, one of the operating stages 121-127 is a radix-2 structure, and each one of the others operating stages 121-127 is a 4-radix structure. The radix-2 structure is utilized for processing an input sequence having two samples. The radix-4 structure is utilized for processing an input sequence having 4 samples. When these operating stages 121-127 are connected in series, a total quantity of points is 8192 ($2*4^6$). The above-mentioned "sample" and the following "sample" comprise in-phase channel signals and quadrature-phase channel signals.

In addition, the FFT/IFFT operating core 100 is appropriately utilized in the OFDM receiver.

In order to understand the spirit of the present invention, the zeroth operating stage 121 as shown in FIG. 1 is assumed to be the 2-radix structure, and each one of the other operating stages 122-127 is assumed to be the 4-radix structure.

FIG. 2 illustrates internal modules of the zeroth operating stage 121 in FIG. 1.

As shown in FIG. 2, the zeroth operating stage 121 comprises a second multiplexer M2, a third multiplexer M3, a fourth multiplexer M4, a radix-2 butterfly module 210, a first delay unit 220, and a first multiplier 230.

The second multiplexer M2 selects and outputs the output signal Mo of the first multiplexer M1 (as shown in FIG. 1) when the process indicating signal DIT/DIF indicates the DIT algorithm. The second multiplexer M2 selects and outputs the second output signal $D_{1F}$ of the first operating stage 122 when the process indicating signal DIT/DIF indicates the DIF algorithm. The third multiplexer M3 selects and outputs a twiddle factor $W_{K(n)}$ when the process indicating signal DIT/DIF indicates the DIT algorithm. The third multiplexer M3 selects and outputs a twiddle factor of unit weight (1) when the process indicating signal DIT/DIF indicates the DIF algorithm K is a positive integer and represents a serial number of the operating stage. For example, when K is zero in FIG. 2, the twiddle factor is denoted as $W_{0(n)}$.

The radix-2 butterfly module 210 is utilized for bypassing a part of output signals of the second multiplexer M2 and performing a butterfly operation on other output signals of the second multiplexer M2 and a delay signal of the first delay unit 220. The first delay unit 220 is utilized for delaying the signals bypassed by the radix-2 butterfly module 210 for a predetermined time so as to generate the delay signal. The first multiplier 230 is utilized for performing a complex multiplication operation on an output signal of the third multiplexer M3 and an output signal of the radix-2 butterfly module 210.

The fourth multiplexer M4 selects and outputs an output signal of the first multiplier 230 when the bypass indicating signal BP is disabled. The fourth multiplexer M4 selects and outputs an output signal of the second multiplexer M2 when the bypass indicating signal BP is enabled. That is, when the bypass indicating signal BP is enabled, the zeroth operating stage 121 (as shown in FIG. 1) is excluded in the FFT/IFFT operation and bypasses the output signals of the second multiplexer M2.

The output signals of the fourth multiplexer M4 comprises the first output signal $D_{0T}$ and the second output signal $D_{0F}$. The second output signal $D_{0F}$ will not be used in the next operating stage when the process indicating signal DIT/DIF indicates the DIT algorithm. The first output signal $D_{0T}$ will not be used in the next operating stage when the process indicating signal DIT/DIF indicates the DIF algorithm. As a result, the FFT/IFFT operation will not have problems even if the first output signal $D_{0T}$ and the second output signal $D_{0F}$ are outputted at the same time as shown in FIG. 2.

FIG. 3 illustrates internal modules of one selected from the first operating stages 122 to the sixth operating stages 127 in FIG. 1.

As shown in FIG. 3, each one of the K-th (K is an integer between 1 and 6) operating stages 122-127 comprises a fifth multiplexer M5, a sixth multiplexer M6, a seventh multiplexer M7, a radix-4 butterfly module 310, a delay module 320, and a second multiplier 330.

The fifth multiplexer M5 selects and outputs a first output signal $D_{(K-1)/T}$ when the process indicating signal DIT/DIF indicates the DIF algorithm. The fifth multiplexer M5 selects and outputs a second output signal $D_{(K+1)T}$ when the process indicating signal DIG/DIF indicates the DIF algorithm. It is noted that when K is 6 (i.e. the sixth operating stage 127), the fifth multiplexer M5 selects and outputs the second IFFT input sequence (as shown in FIG. 1) instead of the second output signal $D_{(K+1)F}$. In the last one of the operating stages, the sixth multiplexer M6 selects and outputs a twiddle factor of unit weight (1) based on a controlling signal LS when the FFT/IFFT operation is performed. In the operating stages excluded the zeroth operating stage 121 and the sixth operating stage 127 (i.e. the last operating stage), the sixth multiplexer M6 selects and outputs the twiddle factor $W_{K(n)}$ determined by the process indicating signal DIT/DIF when the FFT/IFFT operation is performed.

The radix-4 butterfly module 310 is utilized for bypassing a part of output signals of the fifth multiplexer M5 and performing a butterfly operation on other output signals of the fifth multiplexer M5 and a plurality of delay signals. The delay signals are generated by the delay module 320. The delay module 320 is utilized for sequentially delaying the signals bypassed by the radix-4 butterfly module 310 so as to generate the plurality of delay signals. The delay module 320 comprises a first delay unit 321, a second delay unit 322, and a third delay unit 323. The first delay unit 321 is utilized for delaying a first signal bypassed by the radix-4 butterfly module 310 for a predetermined time. The second delay unit 322 is utilized for delaying a second signal bypassed by the radix-4 butterfly module 310 for the predetermined time. The third delay unit 323 is utilized for delaying a third signal bypassed by the radix-4 butterfly module 310 for the predetermined time. The radix-4 module 310 is also utilized for performing a butterfly operation on an output signal of the first delay unit 321, an output signal of the second delay unit 322, an output signal of the third delay unit 323, and the output signal of the fifth multiplexer M5. Then, only one of four output signals of the fifth multiplexer M5 is outputted, and the remaining three of the output signals are re-stored in the first delay unit 321, the second delay unit 322, and the third delay unit 323.

The second multiplier 330 is utilized for performing a complex multiply operation on an output signal of the sixth multiplexer M6 and the output signal of the radix-4 butterfly module 310. The seventh multiplexer M7 selects and outputs the output signal of the fifth multiplexer M5 when the bypass indicating signal BP is enabled. The seventh multiplexer M7 selects and outputs an output signal of the second multiplier 330 when the bypass indicating signal BP is disabled. That is, the K-th operating stage is excluded in the FFT/IFFT operation and bypasses the output signal of the fifth multiplexer M5 when the bypass indicating signal BP is enabled.

Output signals of the seventh multiplexer M7 comprises a first output signal $D_{KT}$ and a second output signal $D_{KF}$. The second output signal $D_{KF}$ will not be used when the process indicating signal DIT/DIF indicates the DIT algorithm The first output signal $D_{KT}$ will not be used when the process indicating signal DIT/DIF indicates the DIF algorithm. Accordingly, the FFT/IFFT operation will not have problems even if the first output signal $D_{KT}$ and the second output signal $D_{KF}$ are outputted at the same time as shown in FIG. 3. The twiddle factors $W_{K(n)}$ as shown in FIG. 2 and FIG. 3 are different according to different operating stages.

Although there is no detail illustration in the figures, the multiplexer M3 (as shown in FIG. 2) which is coupled to the first multiplier 230 (as shown in FIG. 2) and the sixth multiplexer M6 (as shown in FIG. 3) which is coupled to the second multiplier 330 (as shown in FIG. 3) are always equal to 1. This can be understood by referring to FIG. 12.

FIG. 4 illustrates operating stages used for different sizes of input sequences and corresponding orders of the operating stages.

The arrow directions in FIG. 4 represent orders of performing the operation. The numerals represent the operating stages.

The following will contain the description of the processes of performing the DIT algorithm The maximum range which can be processed by the FFT/IFFT operating core 100 (as shown in FIG. 1) of the present invention is 8192 points. Accordingly, when an input sequence smaller than 8192 points is processed, only a part of the operating stages are utilized and other operating stages are bypassed.

As shown in FIG. 4, when the FFT size is 16, two operating stages having the radix-4 structure are sequentially utilized. For example, a first operating stage 1 and a second operating stage 2 are sequentially utilized (i.e. 1->2). When the FFT size is 32, a zeroth operating stage 0 having the radix-2 structure is utilized before the first operating stage 1 and the second operating stage 2 (i.e. 0->1->2). When the FFT size is 1024, five operating stages having the radix-4 structure are sequentially utilized. For example, the first operating stage 1, the second operating stage 2, a third operating stage 3, a fourth operating stage 4, and a fifth operating stage 5 are sequentially utilized (i.e. 1->2->3->4->5). In the same manner, when the size of the FFT is 2048 which is two times the size of 1024, the zeroth operating stage 0 having the radix-2 structure is utilized before the first operating stage 1, the second operating stage 2, the third operating stage 3, the fourth operating stage 4, and the fifth operating stage 5 (i.e. 0->1->2->3->4->5).

The processes of performing the DIF algorithm are similar to those of performing the DIT algorithm and will be described in the following.

As shown in FIG. 4, when the IFFT size is 16, two operating stages having the radix-4 structure are sequentially utilized. For example, the third operating stage 3 is utilized, the second operating stage 2 is bypassed, and the first operating stage 1 is utilized (i.e. 3->1). When the IFFT size is 32, the zeroth operating stage 0 having the radix-2 structure is utilized after the third operating stage 3 and the first operating stage 1 (i.e. 3->1->0). When the IFFT size is 1024, five operating stages having the radix-4 structure are sequentially utilized. For example, a sixth operating stage 6, the fourth operating stage 4, the third operating stage 3, the second operating stage 2, and the first operating stage 1 are sequentially utilized (i.e. 6->4->3->2->1). The fifth operating stage 5 is bypassed. In the same manner, when the IFFT size is 2048 which is two times the size of 1024, the zeroth operating stage 0 having the radix-2 structure is utilized after the sixth operating stage 6, the fourth operating stage 4, the third operating stage 3, the second operating stage 2, and the first operating stage 1, (i.e. 6->4->3->2->1->0).

FIG. 5 illustrates memory depths utilized in each operating stages when different sizes of input sequences are inputted.

In FIG. 5, each numeral corresponding to each of the operating stages represents a memory depth. Blanks represent no memory utilized in the corresponding operating stage.

In order to utilize only one FFT/IFFT operating core 100 (as shown in FIG. 1) to perform the FFT operation, the IFFT operation, and the FFT operation, there is a need to dispose an extra memory. The extra memory stores the second IFFT input sequence when the first FFT output sequence is outputted. The extra memory stores the third FFT input sequence when the second IFFT output sequence is outputted.

A memory depth capable of storing a maximum quantity of (N/4) samples is required when the FFT operation is changed from the DIT algorithm to the DIF algorithm. A memory depth capable of storing a maximum quantity of N samples is required when the FFT operation is changed from the DIF algorithm to the DIT algorithm Please refer to FIG. 1 again. The situations about the memory comprise: bits per sample stored in the inputting buffer 110 (as shown in FIG. 1) are less than bits per sample which can be processed in the operating stages of the FFT/IFFT operating core 100 (as shown in FIG. 1), and bits per sample stored in the inputting buffer 110 (as shown in FIG. 1) are equal to bits per sample which can be processed in the operating stages of the FFT/IFFT operating core 100 (as shown in FIG. 1).

In the first situation, when bits per sample stored in the inputting buffer 110 (as shown in FIG. 1) are less than N bits (N is an integer) per sample which can be processed in the operating stages of the FFT/IFFT operating core 100 (as shown in FIG. 1), an extra memory of (N/4) is utilized between the DIT algorithm and the DIF algorithm. An extra memory of (N/4) and a sample memory of (3N)/4 in the sixth operating stage 127 are shared between the DIT algorithm and the DIF algorithm. Since the FFT/IFFT operating core 100 of the present invention is capable of processing a maximum bit of 8192, this situation means that the input sequence less than 8192 bits is required to be processed. In this situation, the inputting buffer 110 is divided into the areas as the following.

FIG. 6 illustrates a structure of the inputting buffer 110 and the processes according to one embodiment of the present invention when bits per sample stored in the inputting buffer 110 (as shown in FIG. 1) are less than N bits (N is an integer) per sample which can be processed in the operating stages of the FFT/IFFT operating core 100 (as shown in FIG. 1). It is noted that the structure of the input buffer 110 is a data structure.

As shown in FIG. 6, when bits per sample stored in the inputting buffer 110 (as shown in FIG. 1) are less than N bits (N is an integer) per sample which can be processed in the operating stages of the FFT/IFFT operating core 100 (as shown in FIG. 1), the inputting buffer 110 is a first structure which comprises a single port static random access memory (referred to as SP-SRAM hereinafter) 601 having a memory depth of 8192 and an SP-SRAM 602 having a memory depth of 2048. The SP-SRAM 602 having a depth of 2048 means the above-mentioned extra memory of (N/4). The processes of reading/writing from a first symbol 1 to a sixth symbol 6 are proceeded according to arrow directions shown in the right hand of the SP-SRAM 601 and the SP-SRAM 602.

The second situation, when bits per sample stored in the inputting buffer 110 (as shown in FIG. 1) are equal to bits per sample which can be processed in the operating stages of the FFT/IFFT operating core 100 (as shown in FIG. 1), an extra memory of (N/4) is shared between the DIT algorithm and the DIF algorithm. The inputting buffer 110 of (N/4) and the sample memory of (3N)/4 in the sixth operating stage 127 are shared between the DIF algorithm and the DIT algorithm. In this situation, the inputting buffer 110 is divided the areas as the following.

Figure 7:
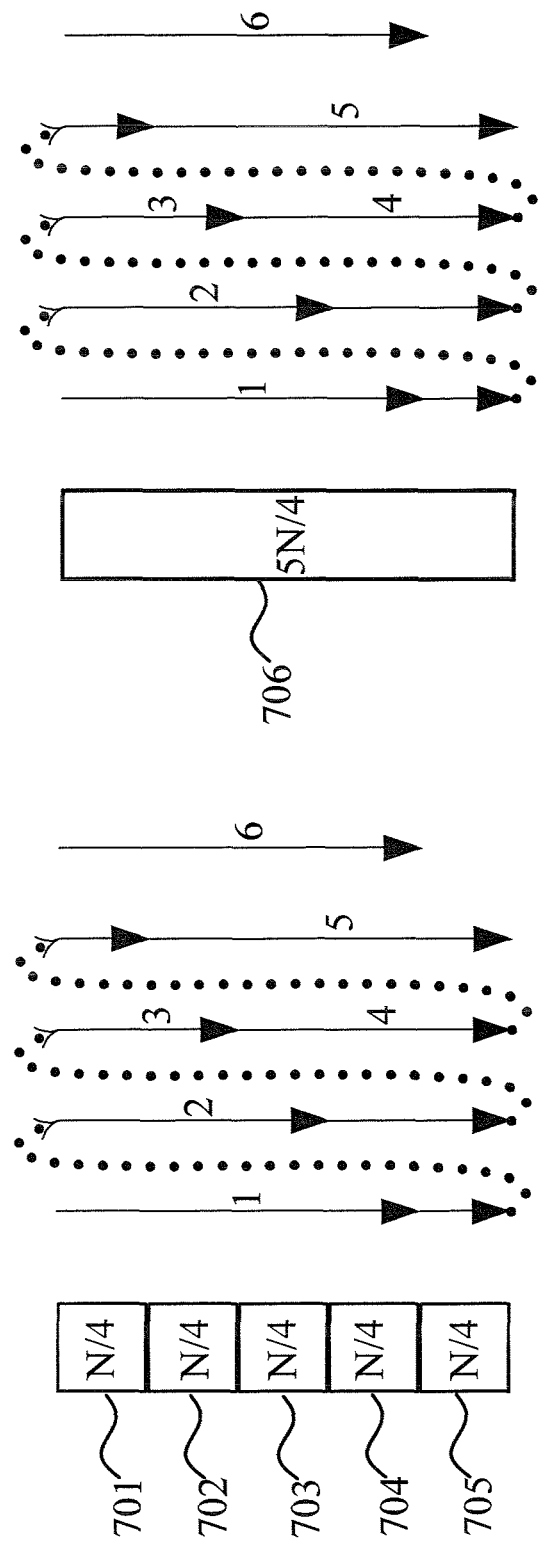
FIG. 7 illustrates a structure of the inputting buffer and the processes according to one embodiment of the present invention when bits per sample stored in the inputting buffer are equal to bits per sample which can be processed in the operating stages of the FFT/IFFT operating core.

FIG. 7 illustrates a structure of the inputting buffer 110 and the processes according to one embodiment of the present invention when bits per sample stored in the inputting buffer 110 (as shown in FIG. 1) are equal to bits per sample which can be processed in the operating stages of the FFT/IFFT operating core 100 (as shown in FIG. 1).

As shown in FIG. 7, when bits per sample stored in the inputting buffer 110 (as shown in FIG. 1) are equal to N bits (N being an integer) per sample which can be processed in the operating stages of the FFT/IFFT operating core 100 (as shown in FIG. 1) and clock frequency of the memory is the same as that of the FFT/IFFT operating core 100, the inputting buffer 110 is a third structure which comprises five SP-SRAMs 701-705 having a memory depth of 2048 (as shown in the left hand of FIG. 7). When bits per sample stored in the inputting buffer 110 (as shown in FIG. 1) are equal to N bits (N is an integer) per sample which can be processed in the operating stages of the FFT/IFFT operating core 100 (as shown in FIG. 1) and clock frequency of the memory is two times clock frequency of the FFT/IFFT operating core 100, the inputting buffer 110 is a second structure which comprises a SP-SRAM 706 having a memory depth of 10240 (as shown in the right hand of FIG. 7).

The first symbol 1 is written/read through the four SP-SRAMs 701-704. The second symbol 2 is written/read through the four SP-SRAMs 705, 701, 702, and 703. Then, the third symbol 3 is written/read through the four SP-SRAMs 704, 705, 701, and 702.

When the inputting buffer 110 is configured as shown in the left hand of FIG. 7, each symbol has one non-used segment whose size is N/4. For example, N samples in the memories 701-704 are read by the operating module 120 so as to perform the FFT operation on the first symbol 1. Then, when the second symbol 2 in the inputting buffer 110 is stored, the fourth memory 704 is always in an idle state. That is, each input symbol has one memory segment which is in the idle state. The memory segment has a size of N/4. In addition, the (3N)/4 sample memory in the sixth operating stage 127 only performs reading access or does not perform any access between the output of the DIT algorithm and the output of the DIF algorithm. Accordingly, after the input of the DIT algorithm is written in the memories, the reading access is performed in the next operating stage so as to share the (3N)/4 sample memory.

As shown in FIGS. 6-7, utilizing one memory whose memory depth is the same as (5N)/4, this is better than utilizing a plurality of memories. The advantages of utilizing one memory includes saving areas and increasing speed. Accordingly, designers of the FFT/IFFT operating core 100 can determine the structure of the inputting buffer 110 based on the above-mentioned advantages.

FIG. 8 illustrates memory types and memory depth of each operating stage when bits per sample stored in the inputting buffer 110 (as shown in FIG. 1) is less than bits per sample which can be processed in the operating stages of the FFT/IFFT operating core 100 (as shown in FIG. 1).

FIG. 9 illustrates memory types and memory depth of each operating stage when bits per sample stored in the inputting buffer 110 (as shown in FIG. 1) being equal to bits per sample which can be processed in the operating stages of the FFT/IFFT operating core 100 (as shown in FIG. 1).

The situation that clock frequency of the memory is the same as that of the FFT/IFFT operating core 100 is shown in left hands of FIGS. 8-9. The situation that clock frequency of the memory is two times clock frequency of the FFT/IFFT operating core 100 is shown in right hands of FIGS. 8-9.

As shown in FIG. 8, the inputting buffer 110 comprises the extra memory of N/4 when bits per sample stored in the inputting buffer 110 (as shown in FIG. 1) is less than bits per sample which can be processed in the operating stages of the FFT/IFFT operating core 100 (as shown in FIG. 1). As shown in FIG. 9, the memory depth of the inputting buffer 110 is 10240 when bits per sample stored in the inputting buffer 110 (as shown in FIG. 1) is equal to bits per sample which can be processed in the operating stages of the FFT/IFFT operating core 100 (as shown in FIG. 1).

Figure 10:
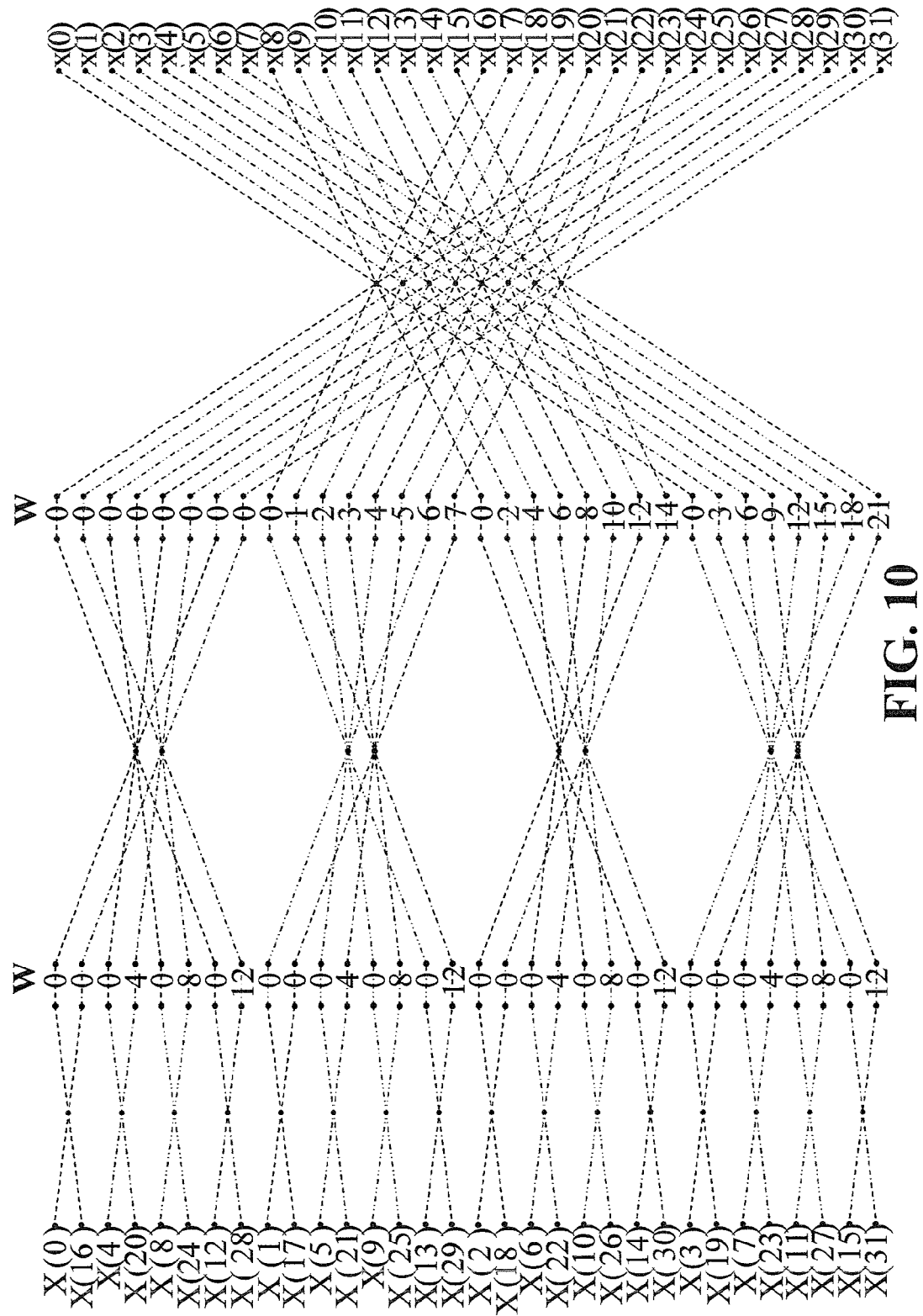
FIG. 10 illustrates a signal flow chart of 32-point FFT by the DIT algorithm.

FIG. 10 illustrates a signal flow chart of 32-point FFT by the DIT algorithm

Figure 11:
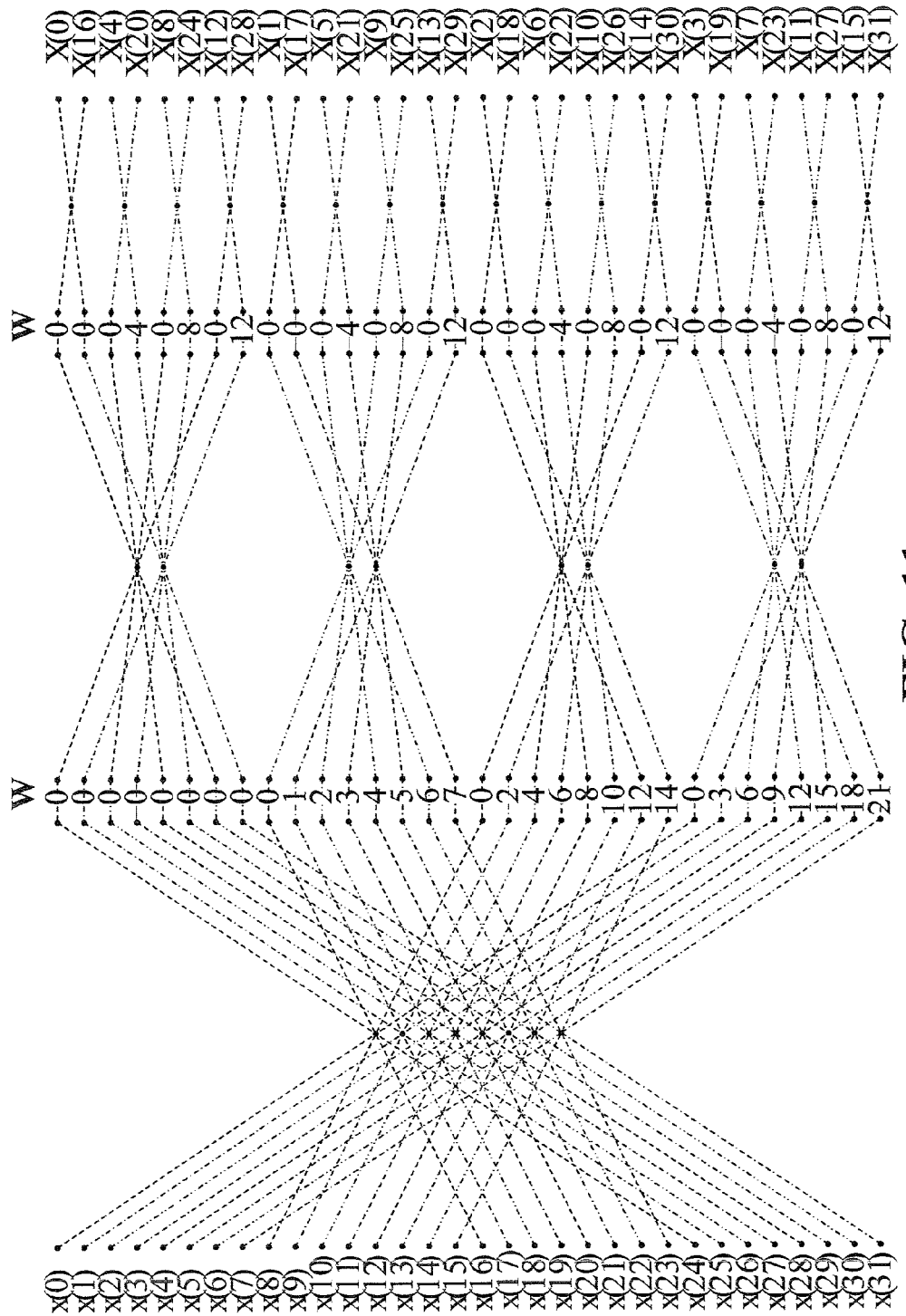
FIG. 11 illustrates a signal flow chart of 32-point IFFT by the DIF algorithm.

FIG. 11 illustrates a signal flow chart of 32-point IFFT by the DIF algorithm

FIGS. 10-11 are conventional operating processes, and thus the conventional operating processes are not described in details herein.

Figure 12:
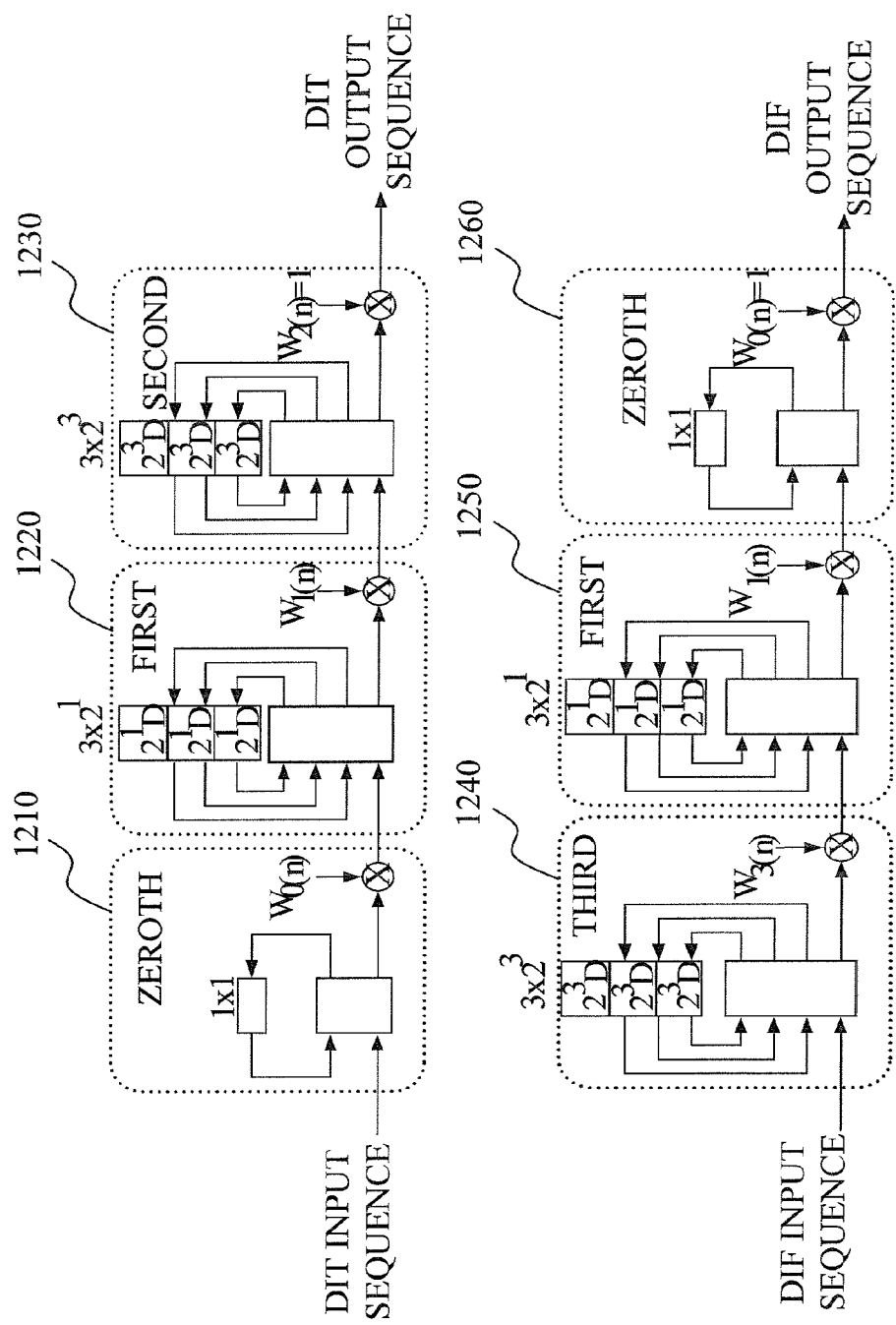
FIG. 12 illustrates connection relationships of each operating stage when the 32-point FFT operation by the DIT algorithm and the 32-point IFFT operation by the DIF algorithm are performed.

FIG. 12 illustrates connection relationships of each operating stage when the 32-point FFT operation by the DIT algorithm and the 32-point IFFT operation by the DIF algorithm are performed.

As shown in FIG. 12, one operating stage having the radix-2 structure and two operating stages having the radix-4 structure are required to perform the 32-point FFT operation by the DIT algorithm and the 32-point IFFT operation by the DIF algorithm. For the sake of description convenience, a zeroth operating stage 1210 having the radix-2 structure, a first operating stage 1220 having the radix-4 structure, and a third operating stage 1230 having the radix-4 structure are assumed to be utilized.

As shown in the upper part of FIG. 12, the 32-point FFT operation on a DIT input sequence are performed through the zeroth operating stage 1210, the first operating stage 1220, and the second operating stage 1230 so as to generate a DIT output sequence. As shown in the lower part of FIG. 12, the 32-point IFFT operation on a DIF input sequence are performed through a third operating stage 1240, a first operating stage 1250, and a zeroth operating stage 1260 so as to generate a DIF output sequence. The twiddle factor $W_{K(n)}$ is always equal to one in the last one of the operating stages herein. The orders of the operating stages shown in FIG. 12 are corresponding to the orders of the 32-point operation by the DIT algorithm and the 32-point IFFT operation by the DIF algorithm FIG. 13 illustrates a timing diagram of performing the 32-point FFT operation and the 32-point IFFT operation when three input sequences are continuously inputted.

Figure 13:
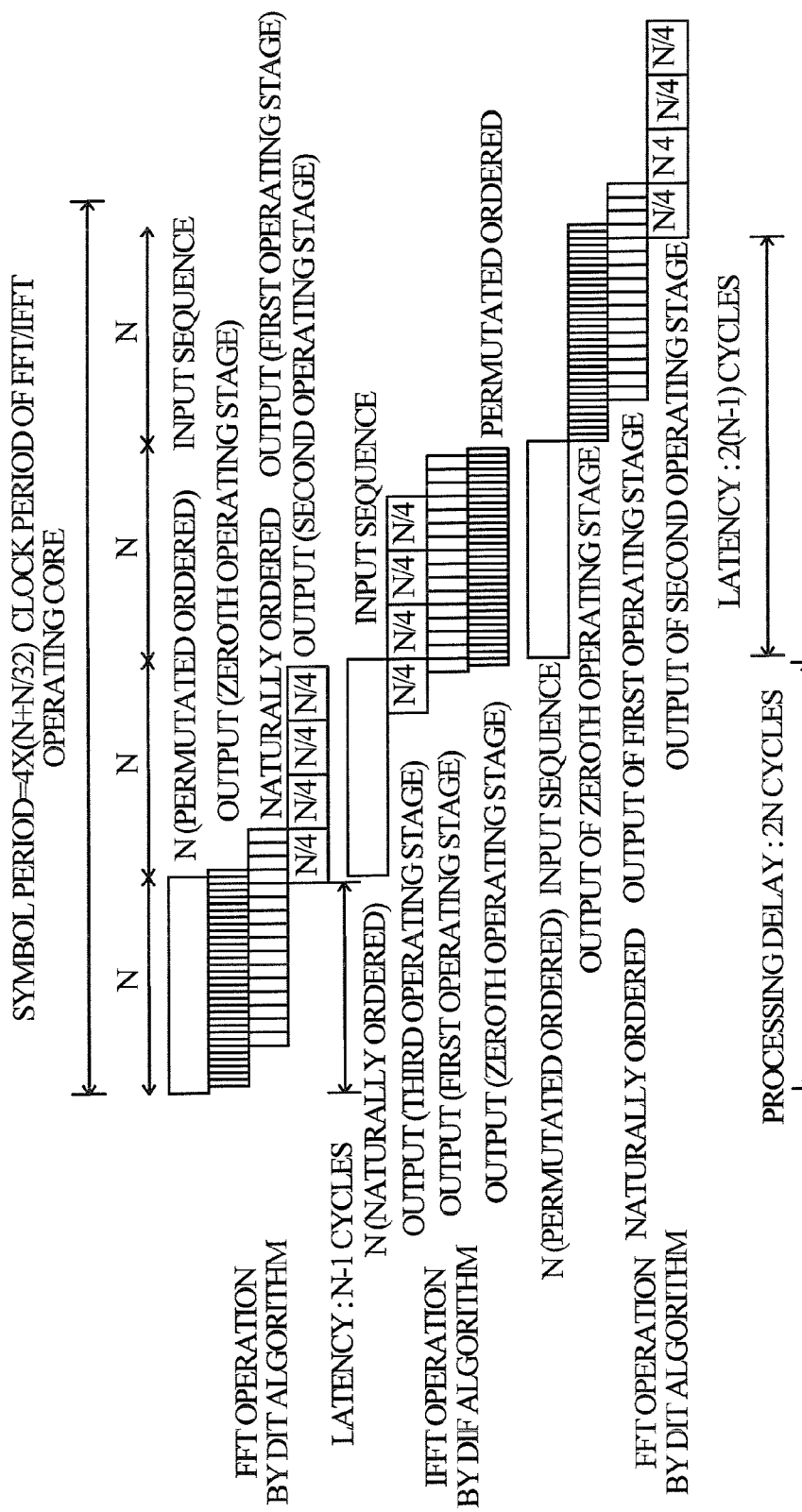
FIG. 13 illustrates a timing diagram of performing the 32-point FFT operation and the 32-point IFFT operation when three input sequences are continuously inputted.

The time diagram in FIG. 13 comprises the FFT operation by the DIT algorithm, the IFFT operation by the DIF algorithm, and the FFT operation by the DIT algorithm. The time diagram shown in FIG. 13 is easily understood by a person having ordinary skill in the art. As a result, the description in detail of FIG. 13 is omitted herein.

The operating stages of the FFT/IFFT operating core 100 according to the present invention comprise a plurality of memories although the memories are not illustrated. The memories are utilized in the operating stages which the operating module 120 comprises. If three operating cores are required to perform three times of operation, the areas of each memory in the operating stages will be three times the area of the present invention. However, the operating core of the present invention performs three times of operation by sharing the operating core by using the DIT algorithm. As a result, compared with the prior art, the present invention can decrease the required area to ⅓ of the prior art.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A fast Fourier transform and inverse fast Fourier transform (FFT/IFFT) operating core, the FFT/IFFT core comprising:
    a first multiplexer, for multiplexing a first FFT input sequence and a third FFT input sequence;
    an inputting buffer, for storing and outputting the first FFT input sequence; and
    an operating module having a zero operating stage, a first operating stage, and a K-th operating stage, wherein the zeroth operating stage, based on a corresponding process indicating signal and a corresponding bypass indicating signal, either for performing one of bypassing an output signal of the first multiplexer and transforming the output signal of the first multiplexer by an FFT operation so as to generate a first output signal $1_0$, or for performing one of bypassing a second output signal $2_1$ of the first operating stage and transforming the second output signal $2_1$ of the first operating stage by an IFFT operation so as to generate a second output signal $2_0$; the first operating stage, based on the corresponding process indicating signal and the corresponding bypass indicating signal, either for performing one of bypassing the first output signal $1_0$ of the zeroth operating stage and transforming the first output signal $1_0$ of the zeroth operating stage by an FFT operation so as to generate a first output signal $1_1$, or for performing one of bypassing a second output signal $2_2$ of a second operating stage and transforming the second output signal $2_2$ of the second operating stage by an IFFT operation so as to generate a second output signal $2_1$; and the K-th operating stage, based on the corresponding process indicating signal and the corresponding bypass indicating signal, either for performing one of bypassing a first output signal $1_{K-1}$ of a (K−1)-th operating stage and transforming the first output signal $1_{K-1}$ of the (K−1)-th operating stage by an FFT operation so as to generate a first output signal $1_K$, or for performing one of bypassing a second IFFT input sequence and transforming the second IFFT input sequence by an IFFT operation so as to generate a second output signal $2_K$, K is an integer greater than or equal to 2;
    wherein the corresponding process indicating signal and the corresponding bypass indicating signal are generated, the corresponding process indicating signal indicates that one of the first FFT input sequence, the second IFFT input sequence, and the third FFT input sequence inputted to the operating module is processed by either a decimation-in-time algorithm or a decimation-in-frequency algorithm, and the corresponding bypass indicating signal indicates whether the one of the first FFT input sequence, the second IFFT input sequence, and the third FFT input sequence inputted to the operating module directly passes the operating module.

2. The fast Fourier transform and inverse fast Fourier transform (FFT/IFFT) operating core of claim 1, wherein at least one stage of the zeroth operating stage to the K-th operating stage has a radix-2 architecture, and other stages thereof have a radix-4 architecture, respectively.

3. The fast Fourier transform and inverse fast Fourier transform (FFT/IFFT) operating core of claim 2, wherein the zeroth operating stage comprises:
    a second multiplexer, wherein the second multiplexer selects and outputs the output signal of the first multiplexer when the corresponding process indicating signal indicates the decimation-in-time algorithm, and the second multiplexer selects and outputs the second output signal $2_1$ of the first operating stage when the corresponding process indicating signal indicates the decimation-in-frequency algorithm;
    a third multiplexer, wherein the third multiplexer selects and outputs a twiddle factor $W_{K(n)}$ when the corresponding process indicating signal indicates the decimation-in-time algorithm, and the third multiplexer selects and outputs a twiddle factor of unit weight when the corresponding process indicating signal indicates the decimation-in-frequency algorithm, wherein K is a serial number of one of the operating stages, and n is a maximum quantity of points of the FFT/IFFT operating core;
    a radix-2 butterfly module, for bypassing a part of output signals of the second multiplexer and performing a butterfly operation on other output signals of the second multiplexer and a delay signal;
    a first delay unit, for delaying the signals bypassed by the radix-2 butterfly module for a specific time so as to generate the delay signal;
    a first multiplier, for performing a logical multiplication operation on an output signal of the third multiplexer and an output signal of the radix-2 butterfly module; and
    a fourth multiplexer, wherein the fourth multiplexer selects and outputs an output signal of the first multiplier when the corresponding bypass indicating signal is disabled, and the fourth multiplexer selects and outputs an output signal of the second multiplexer when the corresponding bypass indicating signal is enabled.

4. The fast Fourier transform and inverse fast Fourier transform (FFT/IFFT) operating core of claim 2, wherein one selected from the first operating stage to the K-th operating stages comprises:

a fifth multiplexer, wherein the fifth multiplexer selects and outputs the first output signal $1_{K-1}$ of the (K−1)-th operating stage when the corresponding process indicating signal indicates the decimation-in-time algorithm, and the fifth multiplexer selects and outputs a second output signal $2_{K+1}$ of a (K+1)-th operating stage when the corresponding process indicating signal indicates the decimation-in-frequency algorithm;

a sixth multiplexer, wherein the sixth multiplexer selects and outputs a twiddle factor $W_{K(n)}$ when the corresponding process indicating signal indicates the decimation-in-time algorithm, and the sixth multiplexer selects and outputs a twiddle factor of unit weight when the corresponding process indicating signal indicates the decimation-in-frequency algorithm, wherein K is a serial number of one of the operating stages, and n is a maximum quantity of points of the FFT/IFFT operating core;

a radix-4 butterfly module, for bypassing a part of output signals of the fifth multiplexer and performing butterfly operation on other output signals of the fifth multiplexer and a plurality of delay signals;

a delay module, for sequentially delaying the signals bypassed by the radix-4 butterfly module so as to generate the delay signals;

a second multiplier, for performing a logical multiplication operation on an output signal of the sixth multiplexer and an output signal of the radix-4 butterfly module; and a seventh multiplexer, wherein the seventh multiplexer selects and outputs an output signal of the fifth multiplier when the corresponding bypass indicating signal is enabled, and the seventh multiplexer selects and outputs an output signal of the second multiplier when the corresponding bypass indicating signal is disabled.

5. The fast Fourier transform and inverse fast Fourier transform (FFT/IFFT) operating core of claim 4, wherein the delay module comprises:

a first delay unit, for delaying a first signal selected from the signals bypassed by the radix-4 butterfly module for a predetermined time;

a second delay unit, for delaying a second signal selected from the signals bypassed by the radix-4 butterfly module for the predetermined time; and a third delay unit, for delaying a third signal selected from the signals bypassed by the radix-4 butterfly module for the predetermined time.

6. The fast Fourier transform and inverse fast Fourier transform (FFT/IFFT) operating core of claim 4, wherein the twiddle factor $W_{K(n)}$ of each operating stage is either the same or different.

7. The fast Fourier transform and inverse fast Fourier transform (FFT/IFFT) operating core of claim 4, wherein in the last one of the operating stages, each one of the twiddle factor $W_{K(n)}$ inputted to the corresponding multiplier is equal to 1 when the FFT operation and the IFFT operation are performed.

8. The fast Fourier transform and inverse fast Fourier transform (FFT/IFFT) operating core of claim 1, wherein a structure of the inputting buffer is one of:

a first structure, comprising a first main memory with an first extra memory combined together, the first main memory having a memory depth of N, and the first extra memory having a memory depth of (N/4);

a second structure, comprising a second main memory, the second main memory having a memory depth of (5N)/4; and a third structure, comprising five second extra memories, each second extra memory having a memory depth of (N/4), wherein N is a positive integer, and N is a maximum input sequence which the FFT/IFFT core is capable of processing.

9. The fast Fourier transform and inverse fast Fourier transform (FFT/IFFT) operating core of claim 1, wherein the corresponding process indicating signal and the corresponding bypass indicating signal are determined by a size of the first FFT input sequence, a size of the third FFT input sequence, and a size of the second IFFT input sequence.

* * * * *

UNITED STATES PATENT AND TRADEMARK OFFICE
CERTIFICATE OF CORRECTION

| | |
|---|---|
| PATENT NO. | : 8,917,588 B2 |
| APPLICATION NO. | : 12/996779 |
| DATED | : December 23, 2014 |
| INVENTOR(S) | : Chang-ik Hwang |

Page 1 of 1

It is certified that error appears in the above-identified patent and that said Letters Patent is hereby corrected as shown below:

On the title page item (73) should read:

(1) Silicon Motion, Inc. (China), (2) Silicon Motion, Inc. (Taiwan), and (3) FCI Inc.

Signed and Sealed this
Fifth Day of January, 2016

Michelle K. Lee
*Director of the United States Patent and Trademark Office*